Figure 1:
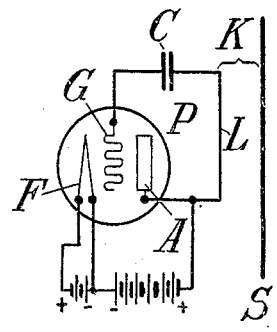

May 19, 1931.  A. ESAU  1,806,245

SHORT WAVE OSCILLATOR

Filed Feb. 12, 1927

Inventor
Abraham Esau
By
Attorney

Patented May 19, 1931

1,806,245

UNITED STATES PATENT OFFICE

ABRAHAM ESAU, OF JENA, GERMANY

SHORT WAVE OSCILLATOR

Application filed February 12, 1927, Serial No. 167,650, and in Germany February 18, 1926.

My invention relates to an arrangement for generating very short electric waves by means of vacuum discharge devices. When generating very short electric waves, a natural limit is soon reached where a further decrease of the wave-length is impossible. This limit is given by the electric dimensions of the circuit used. As is well known the natural frequency of an oscillatory circuit is determined by the value of its active capacity and inductance and may be calculated by Thomson's formula. The inherent capacity or the inductance of an oscillatory circuit cannot possibly be decreased at will, for, though the capacity concentrated in a condenser or in an induction coil may be varied, the connecting leads of the circuit themselves alone or in conjunction with the elements of the vacuum discharge device would still present a certain value of distributed capacity and inductance determined essentially by the geometric dimensions of the circuit.

Thus, when using a short-wave vacuum tube generator, it is possible to shorten the connecting leads of the tube elements to a certain extent only. However, if even it were possible by a proper arrangement of the current carrying members to hold these values within very small limits, the decrease of the natural frequency of the oscillatory system would be rendered useless by the reduction of the amount of energy the system is able to produce. As the energy output in an oscillatory circuit is directly proportional to the value of its active capacity, and as the natural wave length, as shown by Thomson's formula, is proportional to the square root of the active capacity, the energy e. g., when decreasing the capacity to a fourth part, also decreases to the fourth part, whereas the natural wave length only decreases to one half part. It seems, therefore, not to be advisable to reach a decrease of the natural wave length by a considerable decrease of the electric dimensions of the oscillatory circuit.

According to my invention I obviate these drawbacks by an arrangement hereinafter more fully set forth, reference being taken to the accompanying drawing in which I show two ways of embodiment of the salient principles of my invention.

It is well-known, when coupling an oscillatory circuit system to another system having equal natural frequency, that there are set up in both circuits oscillations of two frequencies, one greater and one less than the natural frequency of each circuit alone, and that these frequencies are dependent on the coefficient of coupling existing between the two circuits. According to my invention I make use of these phenomena for producing extremely short electric waves with a high efficiency.

Referring to the figure 1 of the drawing P represents an exciting oscillatory circuit, in the example shown the oscillatory anode circuit of a vacuum tube generator having normal heating filament electrode F, grid controlling electrode G and anode A in series with a shortening capacity C and the connecting lead L joining anode and grid electrodes. The battery for heating the filament F and a high potential battery placed between anode and filament electrode for giving the former a high positive potential are shown. The natural frequency of the circuit P is supposed to have the value λ which may be calculated by means of the afore-mentioned constants, using Thomson's formula. A secondary circuit S (aerial circuit) is coupled with the primary exciting circuit P. This secondary circuit in the case shown has the shape of an outstretched wire, as is the general use in short wave work and is given such a length as to possess the same natural wave length as the primary exciting circuit P i. e. its length must be one half of the exciting wave length of the primary circuit. With a certain degree of coupling K between both circuits, the wave length of the primary circuit and the wave length of the aerial circuit are identical. If this critical coupling coefficient between the two circuits is increased, there are set up in both circuits oscillations of two frequencies, one greater and one less than the natural frequency or natural wave length of each circuit alone. The closer the coupling is made, the more apart the two coupling waves are and it is thus possible to obtain a wave length lying very far below the wave length determined by the natural constants of the circuit. In the example illustrated the coupling degree K is determined by the distance of the out stretched wire S from the connecting lead L of the tube oscillatory circuit. The shorter this distance, the closer the coupling, the more the coupling waves are spaced apart, and the greater the decrease of the wave length thus obtained. Thus, varying this distance presents an easy method for varying the radiated wave length within considerable limits.

When dealing with longer waves a close coupling has always been purposely avoided to prevent the radiation of a second wave representing considerable waste of energy and causing interference in receivers. However, when dealing with a system of very short waves according to my invention considerable advantages with a close coupling are obtained. The two coupling frequencies may be determined as to their frequency by the formulæ:

$$n_I = \frac{n}{\sqrt{l-k}}$$

$$n_{II} = \frac{n}{\sqrt{l+k}}$$

wherein $n_I$ and $n_{II}$ are the two coupling frequencies, $n$ is the natural frequency of one circuit alone and $k$ represents the coupling coefficient between both circuits. It is evident, especially when dealing with very short waves or very high frequencies, that the difference of the frequencies of both waves obtained $n_I - n_{II}$ becomes very large.

According to another feature of my invention I employ these two coupling waves simultaneously for the wireless transmission of signals. Experiments made about the propagation of electric waves have shown that disturbing influences on the reception of radio signals, such as those well known as atmospherics and fading, do not occur simultaneously on waves of different frequencies, so that a signal sent out by two waves of different lengths simultaneously, in case of the communication becoming disturbed on one wave, may be relied upon to be readily received on the other wave. Thus when using both coupling waves for the transmission it is possible because of their great differences of frequency, which may be varied at will, to be independent of atmospheric disturbances and fading. A further advantage of this method of generating both waves consists in that both waves are produced by one and the same circuit arrangement and may therefore be readily controlled simultaneously by one and the same controlling device.

If the desire is to use only one very short wave, most favorable energy output conditions are obtained by using the shorter wave length. For, the shorter one of the coupling waves contains the greater energy output, as the amplitudes of the currents of both coupling waves are approximately inversely proportional to their respective wave lengths. Although the energy output in this case is divided between both waves, the portion of it belonging to the shorter one of the coupling waves obtained by a close coupling is considerably larger than that which would be obtained when producing the same wave length by a decrease of the circuit dimensions.

By mistuning or making the antenna circuit a periodic with respect to the primary circuit, and by a proper choosing of the coupling and the damping constants, the proportion of energy output of both waves may be changed at will. When using only the shorter wave it is advisable to make this proportion very great, whereas when working on both waves an equal proportion of the energy outputs may be preferable.

Figure 2:
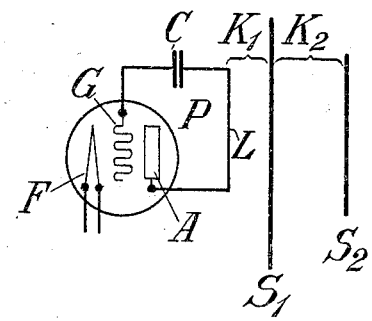

According to another feature of my invention one wave only may be radiated and for this end I couple with the secondary circuit another circuit $S_1$, as is represented by the Figure 2 of the drawings. $S_1$ is the secondary circuit corresponding to circuit S according to Figure 1. The other reference characters are similar to those of Figure 1 and refer to equivalent elements. If $S_2$, which in this case like circuit $S_1$, has the shape of an outstretched wire, is coupled loosely to secondary circuit $S_1$ (coupling coefficient $K_2$), so that no perceptible reaction of circuit $S_2$ on circuit $S_1$ will take place, and so that any influence on the wave length of this circuit may be neglected, this second circuit will, when tuned to the shorter one of the coupling waves, radiate this one wave only.

However, if the coupling degree $K_2$ between $S_1$ and $S_2$ is also rendered very close, a further splitting up of the wave length may be carried out, and still shorter waves may be obtained by this method and radiated by an antenna circuit.

What I claim and wish to be secured by Letters Patent of the United States is:

1. A short wave oscillator of the character described, comprising, in combination, a three electrode vacuum tube having an incandescent cathode, a grid control electrode and an anode, a lead connecting said grid electrode and anode and forming by its distributed inductance, together with the inherent tube capacity operative between said grid electrode and anode, an oscillatory circuit of short natural wave length in which initial oscillations are maintained by capacitative reaction existing between the tube elements, a linear antenna wire in close coupling proximity to said connecting lead to obtain two coupling waves in it, one below and one above the natural wave length of said oscillatory circuit, and a second antenna wire in close coupling proximity to said first antenna wire and tuned to the wave length of one of said coupling waves.

2. A short wave oscillator of the character described, comprising, in combination, a three electrode vacuum tube having an incandescent cathode, a grid control electrode and an anode, a lead connecting said grid electrode and anode and forming by its distributed inductance, together with the inherent tube capacity operative between said grid electrode and anode, an oscillatory circuit of a short natural wave length in which initial oscillations are maintained by capacitative reaction existing between the tube elements, a straight antenna wire of the same natural wave length as the oscillatory circuit, the said lead of the oscillatory circuit having a straight portion so coupled to the antenna wire as to cause the oscillations in the oscillatory circuit to produce in said wire two waves, one above and one below the natural wave length of said circuits, and a second linear antenna wire in coupling proximity to said first antenna wire and tuned to the wave length of one of the said produced waves.

3. A short wave oscillator of the character described comprising, in combination, a three-electrode vacuum tube having an incandescent cathode, a grid control electrode and an anode, a lead connecting said grid electrode and anode and forming, by its distributed inductance in conjunction with the inherent tube capacity between said grid electrode and anode, an oscillatory circuit of short natural wave length in which initial oscillations are maintained by capacitative reactions between said tube elements, and a power receiving circuit so adjusted with respect to said oscillatory circuit as to oscillate the wave produced thereby into two coupling waves corresponding to the formulas $$n_I = \frac{n}{\sqrt{l-k}}$$

and $$n_{II} = \frac{n}{\sqrt{l+k}}$$

wherein $n_I$ and $n_{II}$ are the two coupling frequencies, $n$ the natural frequency of one circuit alone and $k$ the coupling coefficient between both circuits.

4. The method of generating and transmitting ultrashort waves, which consists in generating a fundamental short wave, splitting said fundamental wave into a plurality of waves, one at least of which is shorter than the fundamental wave, and transmitting the ultrashort wave so produced.

5. A short wave oscillator of the character described, comprising, in combination, a three electrode vacuum tube having an incandescent cathode, a gride control electrode and an anode, a shortening condenser, a lead having said condenser arranged therein and connecting said grid electrode and anode and forming by its distributed inductance, together with the inherent capacity between said grid electrode and anode, an oscillatory circuit of short natural wave length in which initial oscillations are maintained by capacitative reactions existing between the tube elements, and a straight secondary circuit, the said lead in the oscillatory circuit having a straight portion parallel with said secondary circuit and so coupled thereto that the oscillations produced in the oscillatory circuit cause the production in said secondary circuit of two different waves, one above and one below, the natural wave length of either circuit alone.

In testimony whereof I have affixed my signature.

ABRAHAM ESAU.